United States Patent
Laamanen et al.

(10) Patent No.: US 7,359,467 B2
(45) Date of Patent: Apr. 15, 2008

(54) METHOD AND APPARATUS FOR INCREASING THE QUALITY OF THE RECEIVER SYNCHRONIZATION OF QAM OR CAP MODULATED MODEM CONNECTION

(75) Inventors: Heikki Laamanen, Espoo (FI); Janne Väänänen, Espoo (FI)

(73) Assignee: Tellabs OY, Espoo (FI)

( * ) Notice: Subject to any disclaimer, the term of this patent is extended or adjusted under 35 U.S.C. 154(b) by 671 days.

(21) Appl. No.: 10/433,402

(22) PCT Filed: Dec. 5, 2001

(86) PCT No.: PCT/FI01/01060

§ 371 (c)(1),
(2), (4) Date: Jun. 3, 2003

(87) PCT Pub. No.: WO02/47346

PCT Pub. Date: Jun. 13, 2002

(65) Prior Publication Data

US 2004/0022328 A1     Feb. 5, 2004

(30) Foreign Application Priority Data

Dec. 5, 2000    (FI)  .................................. 20002670

(51) Int. Cl.
*H04L 7/00*     (2006.01)

(52) U.S. Cl. ..................................................... 375/354

(58) Field of Classification Search ................ 375/316, 375/354, 261
See application file for complete search history.

(56) References Cited

U.S. PATENT DOCUMENTS

| 5,550,596 | A | * | 8/1996 | Strolle et al. ............... 348/607 |
| 5,878,088 | A | * | 3/1999 | Knutson et al. ............ 375/324 |
| 6,021,167 | A | * | 2/2000 | Wu .............................. 375/354 |
| 6,259,743 | B1 | * | 7/2001 | Garth .......................... 375/261 |
| 6,836,507 | B1 | * | 12/2004 | Gifford et al. .............. 375/150 |
| 6,904,110 | B2 | * | 6/2005 | Trans et al. ................. 375/350 |
| 2004/0246891 | A1 | * | 12/2004 | Kay et al. .................. 370/215 |

FOREIGN PATENT DOCUMENTS

| EP | 0 828 366 A2 | 3/1998 |
| EP | 1 063 824 A2 | 12/2000 |
| JP | 081139782 A | 5/1996 |
| WO | 99/60743 A1 | 11/1999 |

* cited by examiner

*Primary Examiner*—Jean B Corrielus
(74) *Attorney, Agent, or Firm*—Birch, Stewart, Kolasch & Birch, LLP

(57) ABSTRACT

The invention relates to a method and apparatus for improving the quality of receiver synchronization on QAM- or CAP-modulated modem connections having an adaptive linear equalizer. The invention is based on the finding that in a QAM- or CAP-modulated data transmission system where the symbol rate and the average carrier frequency are in fixed relationship with each other, the vector formed by the In-phase and the Quadrature component of the detector input signal rotates with the timing phase shift of the receiver. The quality of receiver synchronization is improved by utilizing information extracted from the vector rotation.

6 Claims, 2 Drawing Sheets

Symbol constellation at detector input when timing phase is offset from its optimal value making angle φ different from zero (shown on an arbitrary scale of axes)

b)

Symbol constellation at detector input when timing phase is optimal in 16-QAM or 16-CAP modulation (shown on an arbitrary scale of axes)

✕ : symbol location
• : detector input signal location a)

METHOD AND APPARATUS FOR INCREASING THE QUALITY OF THE RECEIVER SYNCHRONIZATION OF QAM OR CAP MODULATED MODEM CONNECTION

This application is the national phase under 35 U.S.C. § 371 of PCT International Application No. PCT/FI01/01060 which has an International filing date of Dec. 5, 2001, which designated the United States of America.

FIELD OF THE INVENTION

The invention relates to a method and an apparatus for improving quality of receiver synchronization on a modem connection that utilizes QAM- or CAP-modulation (Quadrature Amplitude Modulation, Carrierless Amplitude and Phase).

BACKGROUND OF THE INVENTION

In the text describing the prior art and the features of the present invention, the following abbreviations are used:

| | |
|---|---|
| CAP | Carrierless amplitude and phase modulation |
| FIR | Finite impulse response (filter) |
| QAM | Quadrature amplitude modulation |
| RX | Receiver |
| TX | Transmitter |

On a modem connection, the operation of the receiving device (receiver RX) must be synchronized with the operation of the transmitting device (transmitter TX). The transmitter converts the digital bit stream to be transmitted into a symbol stream that is then converted into an analog signal for transmission over a copper wireline. The received analog signal is processed by analog signal processing techniques, where-upon the signal is converted back into a digital sample stream. In the receiver, the stream of symbol values thus passed over the transmission channel is regenerated from these sample values by digital signal processing techniques. Finally, the original bit stream is regenerated from the symbol values extracted in the receiver. Receiver synchronization is implemented by controlling the clock of the receiver so that the instants of symbol decisions are as closely as possible at a constant phase in regard to the phase of the symbols sent by the transmitter. The timing of receiver operation is controlled by a signal whose value is dependent on the phase difference between the decision instants and symbol stream received over the transmission channel. Hereinafter, the technique of generating such a timing signal that is proportional to the phase difference is called a synchronization method and the respective phase difference is called the timing phase of synchronization. To the quality of data transmission, it is essential that the timing phase varies as little as possible over time.

DESCRIPTION OF PRIOR ART

Traditional synchronization techniques herein are square synchronization and correlation synchronization, both of which are described in greater detail, e.g., by E. A. Lee and D. G. Messerschmitt in *Digital Communication* (Chapter 17—Timing Recovery), Kluwer Academic Publishers 1994. A problem hampering these methods is that the timing control signal is corrupted with noise that arises from the generation process of the control signal. Such noise causes variations in the timing phase thus deteriorating the quality of data transmission. Noise can be attenuated by narrowing the passband of the low-pass filter that is an integral part of the receiver means, but this approach in turn deteriorates the capability of the synchronization method to follow changes in the data rate of the symbol stream and to compensate for the effects of possible disturbances imposed on the analog circuitry of the receiver.

Receiver synchronization with advantageous noise characteristics, yet being fast enough to follow data rate variations of the transmitted symbol stream, can be realized by utilizing information carried along with the detector input signal, see e.g. Yasuharu Yoshida, U.S. Pat. No. 4,528,512. The timing control signal can be formed on the basis of the detector input signal only if the detector of the system is not preceded by any other signal processing mechanisms that are capable of compensating for timing phase shifts. An example of these mechanisms is an adaptive FIR equalizer that in practice must be used to compensate for transmission channel distortion on a modem connection utilizing QAM or CAP modulation. The linear equalizer must be adjusted not only at the initialization of a connection, but also during ongoing data transmission, because variations in ambient conditions such as channel temperature cause changes in the channel distortion. Using the detector input signal information alone in conjunction with an adaptive linear equalizer would eventually cause the timing phase and the distribution of the equalizer tap coefficients to drift continually in opposite directions so as to mutually compensate for the drift in either one of these adjustments. This interaction is due to the fact that the timing control signal derived from the detector input signal is not independent of the distribution of equalizer tap coefficients. The situation would finally wind up into a collapse of the data transmission connection when the distribution of equalizer tap coefficients ultimately drifts out from the temporal length of the linear equalizer.

BRIEF SUMMARY OF THE INVENTION

It is an object of the present invention to overcome the drawbacks of the above-described techniques and to provide an entirely novel type of method and apparatus for use on a digital communications channel.

It is an object of the invention to provide a method and apparatus suited for improving the capability of receiver synchronization used on QAM- or CAP-modulated (Quadrature Amplitude Modulation, Carrierless Amplitude and Phase) modem connections equipped with an adaptive linear equalizer to cope with changes in the symbol stream rate and compensate for the effects of possible disturbances interfering with the operation of the system's analog parts without the risk of impairing the noise properties of clock synchronization. The applications of the invention are focused on systems having a fixed relationship between the symbol rate and the average carrier frequency of the modulated signal.

The goal of the invention is achieved by implementing receiver synchronization control through firstly using information that is proportional to the rotation of the vector formed by the In-phase and Quadrature components ($d_I$ and $d_Q$) of the detector input signal and, secondly, an additional signal that is proportional to the timing phase and is obtained via a method whose output signal about the equilibrium point of the timing phase is independent from the state of those signal processing mechanisms that are capable of compensating for the drift of the timing phase.

The present invention provides a method for improving quality of receiver symbol synchronization on a digital communication connection, in which digital communication connection:

- a signal passed over a channel is received, the received signal being modulated according to one of the following line codes: quadrature amplitude modulation and carrierless amplitude and phase modulation,
- distortion caused by the channel to the received signal is compensated with an adaptive linear equalizer, and
- symbols are recovered from the received signal with a detector.

The method according to the present invention comprises:
- generating a control signal that is proportional to rotation of a vector formed by an In-phase component and a Quadrature component of an input signal of the detector,
- generating an additional signal that is proportional to a timing phase of the receiver symbol synchronization and, in the vicinity of an equilibrium point of the timing phase, said additional signal is independent from state of signal processing mechanisms that can compensate a drift of the timing phase, and
- controlling the receiver symbol synchronization on the basis of a combination of said control signal and said additional signal.

The present invention provides an apparatus for improving quality of receiver symbol synchronization on a digital communication connection, a receiver of the digital communication connection comprising:
- means for receiving a signal passed over a channel, the received signal being modulated with one of the following line codes: quadrature amplitude modulation and carrierless amplitude and phase modulation,
- an adaptive linear equalizer for compensating distortion caused by the channel to the received signal, and
- a detector for recovering symbols from the received signal.

The apparatus according to the present invention comprises in the receiver of the digital communication connection:
- means for generating a control signal that is proportional to rotation of a vector formed by an In-phase component and a Quadrature component of an input signal of the detector,
- means for generating an additional signal that is proportional to a timing phase of the receiver symbol synchronization and, in the vicinity of an equilibrium point of the timing phase, said additional signal is independent from state of signal processing mechanisms that can compensate a drift of the timing phase, and
- means for controlling the receiver symbol synchronization on the basis of a combination of said control signal and said additional signal.

The invention provides significant benefits:

The noise content of the timing phase rotation information is minimal thus permitting a rapid control of phase lock without deteriorating the quality of data transmission, whereby the system becomes more able to adapt to changes in symbol rate and to compensate for the effect of possible disturbances coupled to the analog parts of the system.

The function of the additional timing control signal formed by means of, e.g., the square or correlation method, is only to prevent the above-mentioned phase drift that takes place at a slow pace. Hence, the low-pass filtration used in such a synchronization method based on, e.g., square or correlation techniques, can have a substantially narrower bandwidth than what would be required without the use of the additional timing control signal extracted from the timing phase rotation information. Resultingly, the quality of data transmission is improved, since the noise contained in the timing control signal is reduced by the narrower bandwidth of low-pass filtration.

The benefit of the control signal extracted from the rotation information is that it limits the rate-of-change of the timing phase so that the adaptive linear equalizer can follow changes in the timing phase in an improved manner. Thus, the impairing effect on the quality of data transmission due to noise in the additional timing control signal obtained by means of, e.g., the square or correlation method, is reduced in a substantial manner.

BRIEF DESCRIPTION OF FIGURES

In the following, the invention is described in more detail with reference to exemplifying embodiments elucidated in the appended drawings in which.

DETAILED DESCRIPTION OF THE INVENTION

The theoretical background of the invention is explained in the following treatise.

Figure 1:
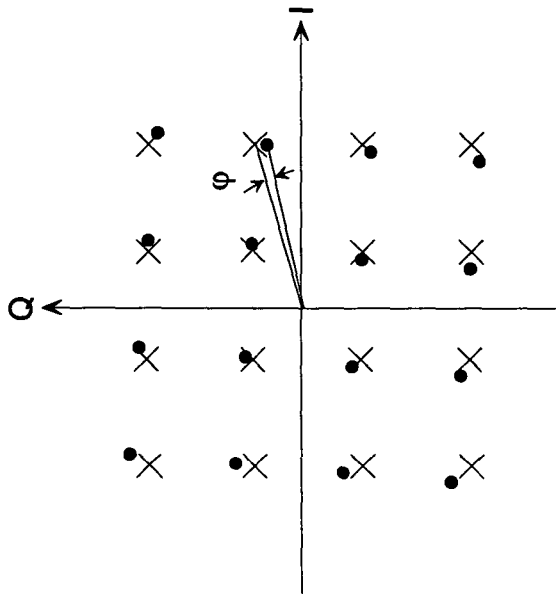
FIG. 1 shows the detector input signal in an x,y coordinate system of a system utilizing QAM or CAP modulation when a) the timing phase is optimal and b) the timing phase has drifted away from the optimal timing situation.
Figure 1:
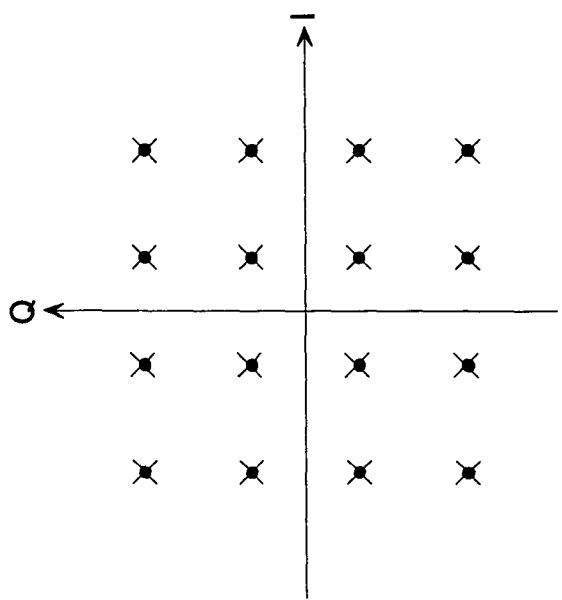

In a system utilizing QAM or CAP modulation and having the symbol rate and the average clock rate in a fixed relationship with each other, the vector (I, Q) formed by the I (In-phase) and Q (Quadrature) components of the detector input signal rotates when the a shift occurs in the timing phase. The situation is elucidated in FIG. 1 for the 16-QAM or 16-CAP modulation scheme. The relationship between the timing angle rotation $\phi$ [rad] and the shift of the timing phase $\tau$ [s] is:

$$\phi = \omega_c \tau, \quad (1)$$

where $\omega_c$ [rad/s] is the average carrier frequency of the QAM or CAP modulation. The noise energy of the timing phase control signal extracted from the timing angle rotation is very small as compared to, e.g., the noise energy of a control signal obtained by the square or correlation method, for instance.

The timing control signal cannot be generated on the basis of the rotation information of the timing angle alone, because the operation becomes unstable in conjunction with an adaptive linear equalizer due to the reasons described above.

Figure 2:
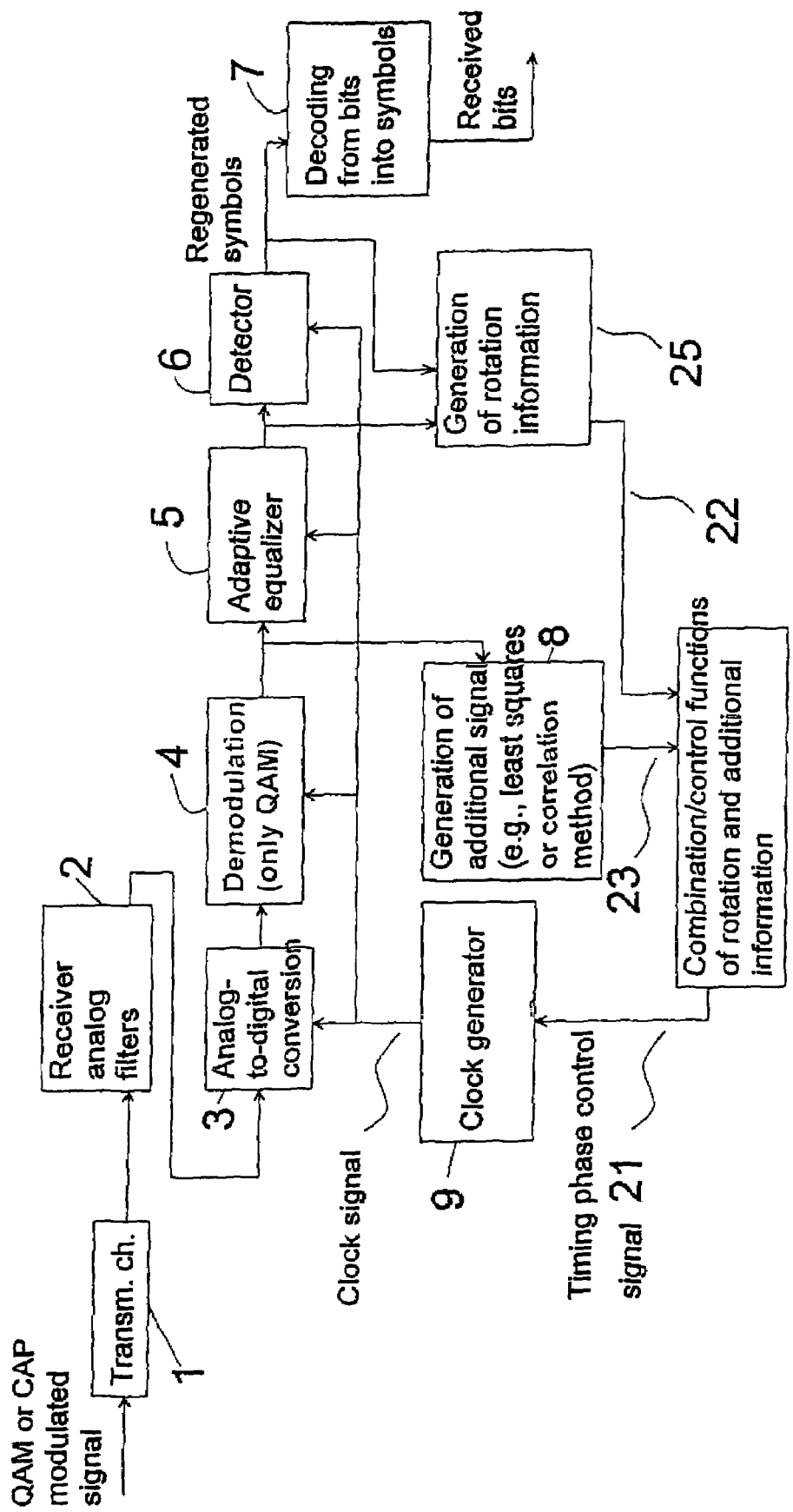
FIG. 2 shows a receiver according to the invention utilizing QAM or CAP modulation, whereby it must be understood that the receiver may also contain such signal processing mechanisms that are not drawn in the diagram, e.g. a DFE (Decision Feedback Equalizer).

An example of a system according to the invention is shown in FIG. 2. Herein, a signal transmitted over a data transfer channel 1 is first conditioned by analog filters 2, whereupon the signal is subjected to an analog-to-digital conversion performed with an analog-to-digital converter 3. Thereupon, if the quadrature amplitude modulation (QAM) is used, the signal is demodulated with a QAM-demodulator 4. The analog filters 2, the analog-to-digital converter 3, and if the quadrature amplitude modulation (QAM) is used, also the QAM-demodulator 4 constitute means for receiving the signal passed over the channel 1, wherein the received signal is modulated with one of the following line codes: the quadrature amplitude modulation (QAM) and the carrierless amplitude and phase modulation (CAP). Next, the signal path includes an adaptive linear equalizer 5 followed by a symbol detector 6. In the next block 7 takes place the decoding of symbols into a bit stream. The timing angle rotation information is formed in a block 25 from the input and output signals of the detector 6. The block 25 constitutes means for generating a control signal 22 that is proportional to rotation of a vector formed by an In-phase component and a Quadrature component of the input signal of the detector 6. A timing control signal 21 is formed by combining the control signal 22 generated on the basis of the timing phase rotation information with such an additional signal 23 formed in a block 8 that is proportional to the timing phase and is formed so that this additional signal in the vicinity of the equilibrium point of the correct timing phase is independent from the state of those signal processing mechanisms that can affect the compensation of the drift of the timing phase. The block 8 constitutes means for generating the additional signal 23 that is proportional to the timing phase of the receiver symbol synchronization and, in the vicinity of an equilibrium point of the timing phase, the additional signal 23 is independent from state of signal processing mechanisms that can compensate a drift of the timing phase. The additional signal 23 can be formed by means of, e.g., a square or correlation method. In the exemplifying embodiment, block 8 forming the additional signal takes its input signal from the input signal of adaptive linear equalizer 5. The timing control signal 21 is applied to the control input of clock generator 9.

The combination of the control signal 22, which is obtained from the timing phase rotation information, with the additional signal 23 obtained using, e.g., a square or correlation method, may in practice take place, e.g., in the following manner:

timing control signal=coeff. 1×control signal obtained from rotation information+coeff. 2×additional signal, whereby the timing control signal is the sum of the output signals of two P-type controllers (proportional control). Coefficient 1 and coefficient 2 are parameters selected so as to optimize the stability and quality parameters of the clock synchronization process. Block 24 constitutes means for controlling the receiver symbol synchronization on the basis of a combination of the control signal 22 and the additional signal 23. Furthermore, even more complicated controller constructions can be used for generating the timing control signal. In practical implementations it has been found advantageous to use a technique wherein the control signal extracted from the timing phase rotation is taken to a P-type controller while the additional control signal is taken to a PI-type (Proportional and Integrating) controller and the outputs of these two are then summed. The generation block 25 of the control signal obtainable from the timing angle rotation information can be implemented, e.g., by computing an approximate value of the rotation angle as a vector product of the detector input signal vector with the symbol decision vector:

$$\phi \sim S_I d_Q - S_Q d_I, \quad (2)$$

where $S_I$ and $S_Q$ are the In-phase and Quadrature components of signal decision, while $d_I$ and $d_Q$ denote the In-phase and Quadrature components of the detector input signal. The same result is also obtained by forming the vector product of the detector error vector with the symbol decision vector:

What is claimed is:

1. A method for improving quality of receiver symbol synchronization on a digital communication connection, in which:

a signal modulated according to one of the following line codes: quadrature amplitude modulation and carrierless amplitude and phase modulation, is passed over the digital communication connection and is received, distortion caused by the digital communication connection to the received signal is compensated with an adaptive linear equalizer, and symbols are recovered from the compensated received signal with a detector, the method comprising:

generating a control signal that is proportional to rotation of a vector formed by an In-phase component and a Quadrature component of an input signal of the detector, generating an additional signal that is proportional to a timing phase of the receiver symbol synchronization, wherein, at timings of said receiver symbol synchronization, said additional signal is not affected while compensating for timing phase drift in said received signal, and controlling the receiver symbol synchronization on the basis of a combination of said control signal and said additional signal.

2. The method of claim 1, wherein the control signal that is proportional to the rotation of the vector formed by the In-phase and the Quadrature components of the detector input signal is obtained as a vector product of the detector input signal with a symbol decision signal.

3. The method of claim 1, wherein the control signal that is proportional to the rotation of the vector formed by the In-phase and the Quadrature components of the detector input signal is obtained as a vector product of a detector error signal with a symbol decision signal.

4. An apparatus for improving quality of receiver symbol synchronization on a digital communication connection for a receiver coupled to the digital communication connection where the receiver includes:

means for receiving a signal passed over the digital communication connection the received signal being modulated with one of the following line codes: quadrature amplitude modulation and carrierless amplitude and phase modulation, an adaptive linear equalizer for compensating distortion to the received signal caused by the digital communication connection, and a detector for recovering symbols from the distortion compensated received signal, the apparatus comprising, in the receiver:

means for generating a control signal that is proportional to rotation of a vector formed by an In-phase component and a Quadrature component of an input signal of the detector, means for generating an additional signal that is proportional to a timing phase of the receiver symbol synchronization, wherein, at timings of said receiver symbol synchronization, said additional signal is not affected while compensating for timing phase drift in said received signal, and means for controlling the receiver symbol synchronization on the basis of a combination of said control signal and said additional signal.

5. The apparatus of claim 4, wherein
the control signal is generated as a vector product of the detector input signal with a symbol decision signal.

6. The apparatus of claim 4, wherein
the control signal is generated as a vector product of a detector error signal with a symbol decision signal.

* * * * *